United States Patent
Lee et al.

(10) Patent No.: US 8,007,862 B2
(45) Date of Patent: Aug. 30, 2011

(54) NANOWIRE GRID POLARIZER AND METHOD OF PREPARING THE SAME

(75) Inventors: Su-mi Lee, Hwaseong-si (KR);
Dong-mok Whang, Yongin-si (KR);
Moon-gyu Lee, Suwon-si (KR);
Yoon-sun Choi, Incheon (KR);
Sun-hwak Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 585 days.

(21) Appl. No.: 12/057,404

(22) Filed: Mar. 28, 2008

(65) Prior Publication Data

US 2009/0074992 A1   Mar. 19, 2009

(30) Foreign Application Priority Data

Sep. 14, 2007   (KR) .................. 10-2007-0093846

(51) Int. Cl.
*B05D 3/10* (2006.01)

(52) U.S. Cl. ....... 427/163.1; 427/58; 427/240; 427/304; 427/305; 427/356; 427/387; 427/430.1; 427/443.1; 427/443.2

(58) Field of Classification Search .................. None
See application file for complete search history.

(56) References Cited

U.S. PATENT DOCUMENTS

| | | | | |
|---|---|---|---|---|
| 4,068,923 | A * | 1/1978 | Toida | 349/132 |
| 5,919,555 | A * | 7/1999 | Yasuda et al. | 428/206 |
| 7,129,202 | B2 * | 10/2006 | Lyu et al. | 510/504 |
| 2006/0147677 | A1 * | 7/2006 | Miyata et al. | 428/166 |
| 2006/0208248 | A1 * | 9/2006 | Lee et al. | 257/3 |
| 2008/0117510 | A1 * | 5/2008 | Cheong et al. | 359/486 |
| 2008/0118660 | A1 * | 5/2008 | Choi et al. | 427/532 |
| 2008/0252825 | A1 * | 10/2008 | Kim et al. | 349/96 |
| 2009/0004375 | A1 * | 1/2009 | Kim et al. | 427/163.1 |
| 2009/0053126 | A1 * | 2/2009 | Lee et al. | 423/350 |

* cited by examiner

*Primary Examiner* — Erma Cameron
(74) *Attorney, Agent, or Firm* — Sughrue Mion, PLLC

(57) ABSTRACT

Provided are a method of preparing a nanowire grid polarizer, and a nanowire grid polarizer prepared using the same. The method includes: mixing a surfactant and a silica precursor to prepare a mesoporous film composition; coating the mesoporous film composition on a substrate; aging the coated product to form a silica template composite; removing the surfactant inside the silica template composite to prepare a mesoporous material having channels; and filling the channels of the mesoporous material with metal. The method is suitable for the formation of a nanowire having a stable structure, mass production, and large-area production.

12 Claims, 9 Drawing Sheets

NANOWIRE GRID POLARIZER AND METHOD OF PREPARING THE SAME

CROSS-REFERENCE TO RELATED PATENT APPLICATIONS

This application claims the benefit of Korean Patent Application No. 10-2007-0093846, filed on Sep. 14, 2007, in the Korean Intellectual Property Office, the disclosure of which is incorporated herein in its entirety by reference.

BACKGROUND OF THE INVENTION

1. Field of the Invention

The present invention relates to a method of preparing a nanowire grid polarizer and a nanowire grid polarizer prepared using the method, and more particularly, to a nanowire grid polarizer which has a stable structure obtained using a mesoporous material and a nanowire grid polarizer prepared using the method.

2. Description of the Related Art

Recently, a demand for display devices having high resolution, high efficiency, and low power consumption has been increasing, so as to display a large capacity of image information, such as a natural moving image. Also, a demand for large display devices is increasing and thus highly productive large-area processing techniques to produce components suitable for such large display devices are required. Specifically, liquid crystal displays (LCDs) provide only 5-7% of light emitted from a light source, such as an LED or a CCFL, to a user and have very low light efficiency, and thus, there is a need to improve such low light efficiency that may be caused by many problems such as the fact that the LCDs are operated by an LC switch and only one polarized light out of an incident beam can be used, which is well known to one skilled in the art. In a conventional LCD device, a liquid crystal and two absorption-type polarized films are used to perform optical switching. In such structure, however, arithmetically about 50% of a non-polarized incident beam is not used (before and after passage through the liquid crystal). To reduce such light loss, 3M Co. developed a dual brightness enhancement film (DBEF) having high efficiency to improve brightness. However, the DBEF is not a complete polarized device, and is expensive because the DBEF requires about a 600 or more-layer deposition process.

Also, the absorptive polarizers can be replaced with reflective polarizers, such as a wire grid polarizer (WGP), which transmit light having a predetermined polarized direction but reflect light having another polarized direction and reuse the reflected light.

A WGP must have a metallic lattice structure in which the metal wires are separated by half or less of a minimum wavelength of a wavelength range of an incident beam. A WGP having such small line width is produced, in general, by forming a nano lattice pattern using an e-beam or laser interference exposure and forming a mold using a polymer material corresponding to the formed nano lattice pattern. Specifically, the mold can be formed using a nano imprinting method, such as a UV calcination method or a hot embossing method. The obtained mold is then subjected to an oblique deposition process, such as a lift-off process or CVD process of a semiconductor manufacturing process, to produce a metallic wire lattice.

The oblique deposition process is, however, unsuitable to obtain a conventional rectangular shape having a high aspect ratio (2:1 or 3:1 or more) that is required to obtain the properties required by the WGP, and also unsuitable for large-area processes producing, for example, a TV. In addition, in the oblique deposition process, an asymmetry of a metallic structure with respect to an inclination direction can affect transitive/reflective properties of an incident beam according to an incident orientation. Furthermore, a micro metallic lattice structure is very fragile to external scratches. Also, US 2003/0117708 et al. discloses a more stable structure with respect to external conditions by using a top substrate or by filling an air layer between a metallic lattice and a dielectric.

SUMMARY OF THE INVENTION

The present invention provides a method of preparing a nanowire grid polarizer, which does not require vacuum conditions and is suitable for large-area production and mass production.

The present invention also provides a nanowire grid polarizer, having a stable structure, obtained using the method.

According to an aspect of the present invention, there is provided a method of preparing a nanowire grid polarizer, the method including: mixing a surfactant and a silica precursor to prepare a mesoporous film composition; coating the mesoporous film composition on a substrate; aging the coated product to form a silica template composite; removing the surfactant inside the silica template composite to prepare a mesoporous material having channels; and filling channels of the mesoporous material with metal.

According to an embodiment, before the coating with the mesoporous film composition, an orientation treatment process can be performed on the substrate by rubbing in advance so that the substrate has an orientation.

According to another embodiment, the orientation treatment process includes forming a polyimide film on the substrate; and rubbing a surface of the polyimide film in a predetermined direction.

According to another embodiment, the forming of the polyimide film includes coating a polyimide precursor on a substrate; and imidizing the coated polyimide precursor by heat treating.

According to another embodiment, the silica template composite can be aligned in a direction perpendicular to the direction in which the rubbing is performed.

According to another embodiment, the method can further include shearing the coated product on the substrate.

According to another embodiment, the mesoporous film composition can be coated by spin coating, dip coating, or bar coating.

According to another embodiment, the surfactant can be poly(alkylene oxide) triblock copolymer.

According to another embodiment, the silica precursor includes one or more compound selected from the group consisting of tetraethylorthosilicate (TEOS), tetramethylorthosilicate (TMOS), tetrabutyl orthosilicate (TBOS) and $SiCl_4$.

According to another embodiment, the mesoporous material is laterally aligned to have a hexagonal array.

According to another embodiment, the surfactant can be removed by calcination or treating with an acid.

According to another embodiment, the calcination can be performed at a temperature of 350° C. to 500° C. for 30 minutes to 10 hours.

According to another embodiment, the metal includes one or more metal selected from the group consisting of Al, Ag, Au, Cu, and Ni.

According to another embodiment, the metal is added to inside the channels of the mesoporous material using an electroless plating method, a chemical reduction method, a metal amplification method, or an electrodeposition method.

According to another embodiment of the present invention, there is provided a nanowire grid polarizer prepared using the method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

The present invention is directed to a method of preparing a mesoporous material disclosed in KR 2007-0036621, which is incorporated by reference in its entirety.

The method according to the present invention includes: mixing a surfactant and a silica precursor to prepare a mesoporous film composition; coating the mesoporous film composition on a substrate; aging the coated product to form a silica template composite; removing the surfactant inside the silica template composite to prepare a mesoporous material having channels; and filling the channels of the mesoporous material with metal.

Figure 1:
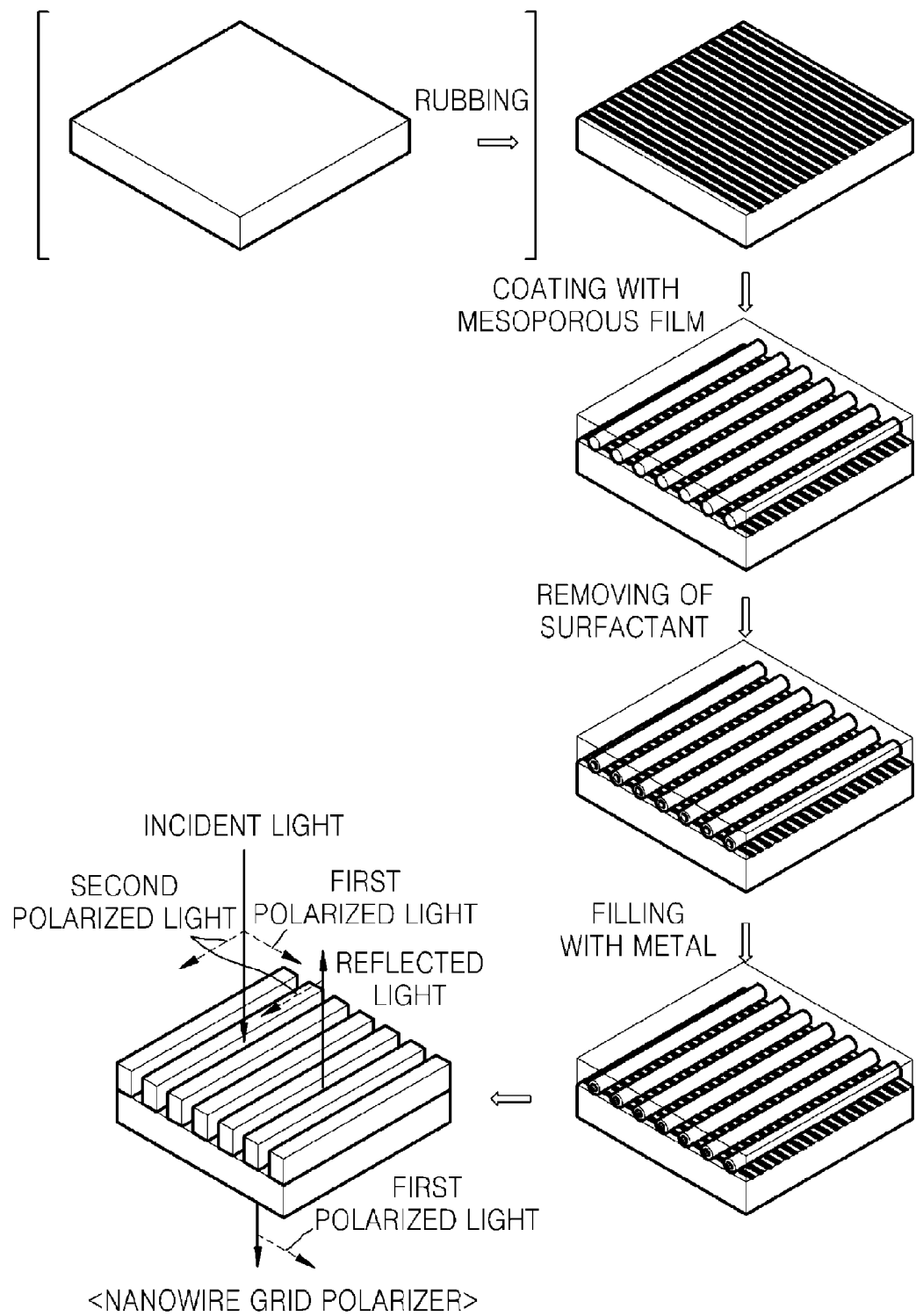
FIG. 1 is a schematic view illustrating a method of preparing a nanowire grid polarizer according to an embodiment of the present invention.

The method according to the present invention is schematically illustrated in FIG. 1. Referring to FIG. 1, a substrate can have an orientation on its surface by rubbing the substrate. When a mesoporous film composition including a template composite consisting of a silica precursor and a surfactant is coated on a substrate, the template composite in the coated film is laterally aligned. Another template composite layer can be deposited on one template composite layer, and the resultant template composite is aged to form a silica template composite. When the surfactant inside the silica template composite is removed using a thermal calcination process or an acid treatment process, a mesoporous material having channels is obtained. Then, the channels of the mesoporous material are filled with metal to thus form such a structure of a nanowire, which is metal that fills the mesoporous material, which is regularly aligned at a predetermined distance. Another metal wire layer can be further deposited on a metal wire layer, and the obtained nanowire grid polarizer is illustrated in the bottom left of FIG. 1. When an incident light including a first polarized light and a second polarized light is irradiated onto the nanowire grid polarizer, the nanowire grid polarizer transmits the first polarized light but reflects the second polarized light using the metallic nanowire as a lattice.

In the method of preparing a nanowire grid polarizer according to the present invention, a mesoporous material having several to several tens of nanometers of pores can be formed in a bottom-up process through a molecular chemical assembling. However, a top-down process uses a substrate and hard stamp that is easily broken during imprinting process and requires sophisticated processing conditions, and thus, it is difficult to commercially use the top-down manner. Unlike the top-down manner, however, the bottom-up manner requires simple processing conditions, does not require vacuum conditions, and is suitable for mass production and large-area production. The method of preparing a nanowire grid polarizer according to the present invention will now be described in detail.

Formation of Mesoporous Material

Figure 2:
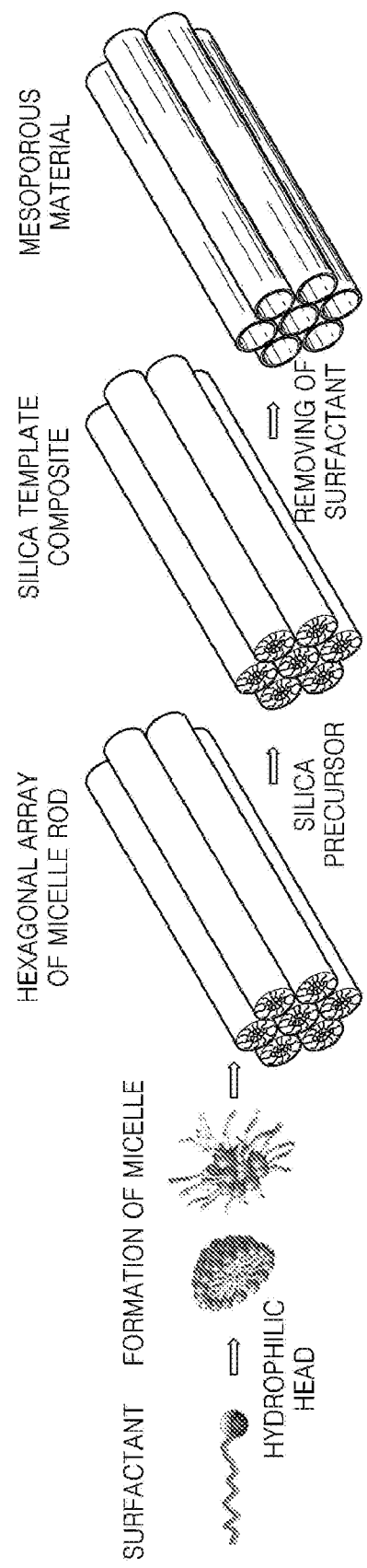
FIG. 2 is a schematic view illustrating a process of preparing a mesoporous material according to an embodiment of the present invention.

FIG. 2 is a schematic view illustrating a process of preparing the mesoporous material according to an embodiment of the present invention. Referring to FIG. 2, a surfactant that is formed of an organic polymer dissolved in a mesoporous film composition forms a micelle and several micelle rods are used to form a hexagonal structure. At the same time, a silica precursor which is added to a coating composition interacts with a hydrophilic head region of the surfactant to form a template composite consisting of the silica precursor and the surfactant. Then, the template composite is aged to prepare a silica template composite, and calcination or washing processes are performed to remove the surfactant from the silica template composite. As a result, a mesoporous material having a regular array of channels can be obtained.

The surfactant used in the method according to the present invention has a hydrophilic head region and a hydrophobic tail region. Due to such structure, the surfactant forms micelles having a uniform composition and structure in a solution, and such micelle structure equilibrates thermodynamically. Therefore, a mesoporous material having pores having a uniform size can be obtained. In addition, various template properties can be obtained according to the kind of the surfactant used. The structure and stability of pores of a mesoporous material are dependent upon a molecular structure of the surfactant, an interaction between a polar part of the surfactant and a silica polymer, an interaction between non-polar parts of the surfactant, and properties of a solvent. That is, according to such interactions and the type and concentration of a surfactant, the structure of the nanowire grid polarizer can have a rod-shaped hexagonal array, a lamellar structure, or a cubic structure. Specifically, the rod-shaped hexagonal array is preferred because one-dimensional nanowires formed of various metals can be very regularly aligned. The surfactant can be selected such that the pore of the formed mesoporous material has a size of several tens of nanometers.

Therefore, in the method according to the present invention, the surfactant can be an amphoteric polymer such as poly(alkylene oxide) triblockcopolymer. Specifically, the surfactant can be poly(ethylene oxide-propylene oxide-ethylene oxide, and preferably, a P123 polymer having a $EO_{20}PO_{70}EO_{20}$ structure. These surfactants can be easily removed using a calcination process or an acid treatment process.

The polymeric surfactant can be used together with a suitable silica precursor to form a template composite having a desired structure. The silica precursor used to form a template composite can be tetraethylorthosilicate (TEOS), tetramethylorthosilicate (TMOS), tetrabutyl orthosilicate (TBOS), tetrachlorosilane ($SiCl_4$), methyltrimethoxysilane, dimethyldimethoxysilane, trimethylmethoxysilane, methyltriethoxysilane, dimethyldiethoxysilane, trimethylethoxysilane, methyltrichlorosilane, dimethyldichlorosilane, trimethylchlorosilane, bis(trichlorosilyl)methane, 1,2-bis(trichlorosilyl)ethane, bis(trimethoxysilyl)methane, 1,2-bis(triethoxysilyl)ethane, 1,4-bis(trimethoxysilyl)benzene, or 1,4-bis(trimethoxysilylethyl)benzene. Specifically, the silica precursor can include one or more compound selected from TEOS, TMOS, TBOS and $SiCl_4$, and preferably, TEOS.

The surfactant and the silica precursor can be mixed in a suitable solvent and the obtained mixed solution is stirred to form a hexagonal array of a template composite in which a micelle rod formed of a surfactant is surrounded by a silica precursor. The obtained mixed solution can include an acidic compound such as HCl or $HNO_3$ that acts as a catalyst. Also, a distance between channels of a mesoporous material that is to be formed can be controlled by adjusting a mixture ratio of the surfactant to the silica precursor, a stirring time, and temperature.

The mesoporous film composition including the surfactant and the silica precursor can be coated on the substrate using a known spin coating method, a known dip coating method or a known bar coating method. The spin coating method is generally used and suitable to form a uniform layer. However, the template composite can be non-uniformly aligned, and thus, the coating process should be performed after an orientation treatment process, as will be described in detail later. The dip coating can provide an orientation to the template composite without any advance process. The bar coating is a method in which a film composition on a substrate is dispersed using a round rolling pin, and the template composite can be laterally aligned without difficulty.

In the coated film on the substrate, the template composite consisting of the silica precursor and the surfactant is aged and thus the silica precursor is subjected to hydrolysis and condensation processes to form silica. Therefore, a silica template composite can be obtained. The aging may be performed in the range of about 20° C. to about 100° C. for about 1 hour to about 36 hours.

The surfactant inside the silica template composite can be removed by calcination or chemical washing. Such calcination is a method of burning out the surfactant, which is an organic polymer material, at a temperature of 350 to 500%, and such chemical washing is a method of dipping the substrate coated with the mesoporous film in an acid-containing alcohol solution to chemically dissolve the surfactant.

Rubbing

When a mesoporous film composition is directly coated on a substrate, a template composite may be randomly aligned and thus channels of a mesoporous material formed by removing a surfactant may also be randomly aligned. To align the template composite in a predetermined direction, the substrate can be treated to obtain an orientation in advance before the mesoporous film composition is coated. Specifically, any known method that is used to align liquid crystals when a LCD or a cell is manufactured can be used to align the template composite. For example, the method according to the present invention can include a rubbing method, a photolithograph method, a contact printing method, or the like, so as to align the template composite. For example, the substrate can be pre-treated to obtain an orientation using a rubbing method that is easy, quick, and inexpensive, and the rubbing method can be used without any limitations on the shape and pattern size of the substrate.

Figure 3:
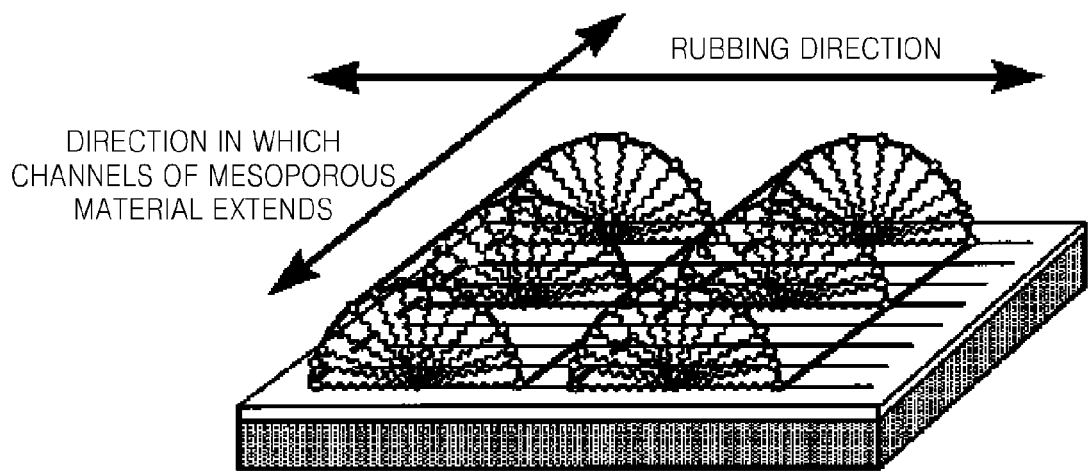
FIG. 3 is a schematic view illustrating a rubbing direction of a polyimide layer and a channel formation direction in a mesoporous material.

The rubbing method includes forming a polyimide film on the substrate; and rubbing a surface of the polyimide film in a predetermined direction. First, a polyimide precursor such as a polyimidic acid is coated on a substrate to form a polyimide film. The polyimide precursor is imidified through a heat treatment process to form a polyimide film on the substrate. The polyimide film is rubbed using a conventional rubbing machine that is generally used in a liquid crystal display process to obtain a one-dimensional fine pattern. FIG. 3 is a schematic view illustrating a channel formation direction in the mesoporous material formed as a result of the rubbing. Referring to FIG. 3, the channel of the mesoporous material is perpendicular to the rubbing direction.

Figure 7:
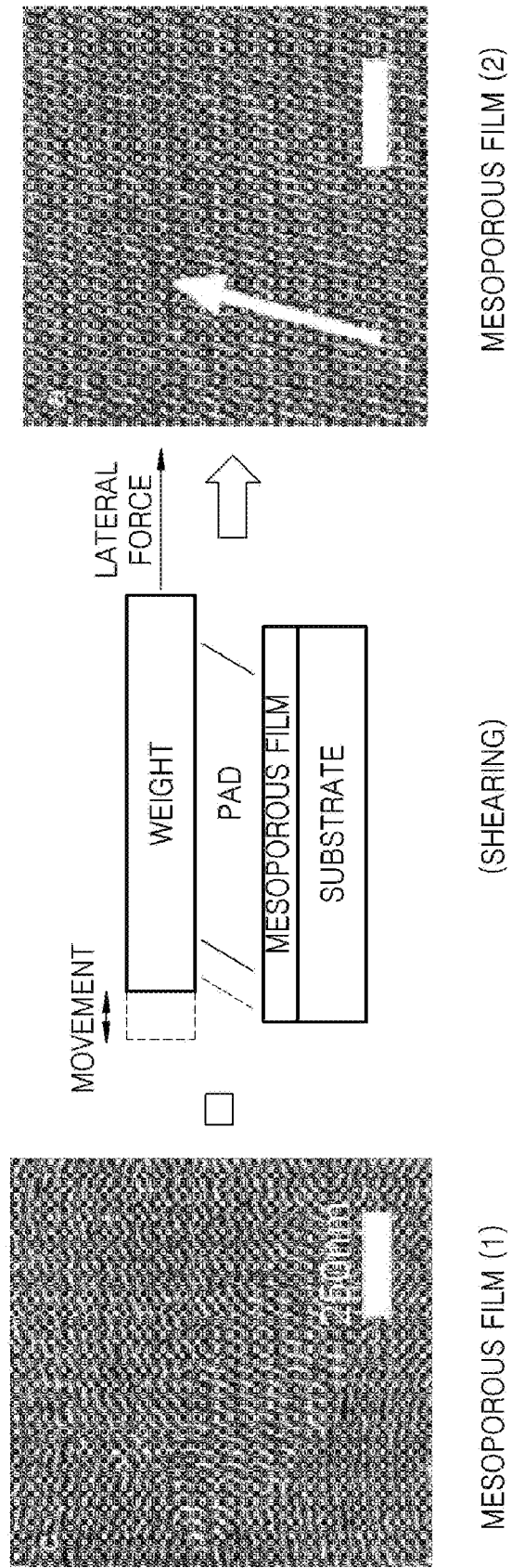
FIG. 7 illustrates a shearing process in which a mesoporous film (1) is aligned in a direction parallel to a shear direction as shown in a mesoporous film (2), according to an embodiment of the present invention.

Alternatively, such orientation treatment can also be performed byafter the mesoporous film is coated, applying a shearing strain to the coated film before the coated film is solidified. Referring to FIG. 7, a weight is placed on a mesoporous film (1) having a non-uniform array of channels, and power is applied such that the weight moves in a lateral direction. Therefore, as shown in the image of the mesoporous film (2), channels are aligned in parallel to a shearing direction.

Filling with Metal

Channels of the mesoporous material can be filled by electroless plating of a metal salt, metal amplification, chemical reduction, or electrodeposition, or filled with nanowires of metal. A metal with which channels are to be filled can include one or more metals selected from the group consisting of Al, Ag, Au, copper, and nickel.

The method according to the present invention can include any known plating method. For example, a metal catalyst is loaded to the inside channels of the mesoporous material and the resultant channels are immersed in a desired metallic ion-containing plating vessel to form a nanowire inside each channel.

An embodiment of the metal amplification will now be described in detail. First, the inside of the channels of the mesoporous material is functionalized using, for example, 3-aminopropyltriethoxysilane (APTES) so that the channels can be easily filled with metallic ion, and the filled metallic ion is reduced to form a metal nanowire inside the channels. The material used to functionalize inside of channels can be, in addition to 3-aminopropyltriethoxysilane, 3-(2-aminoethylamino)propyltrimethoxysilane, (3-trimethoxysilylpropyl)diethylenetriamine, N-(trimethoxysilylpropyl)ethylenediamine triacetic acid sodium salt, or a mixture thereof.

Alternatively, the channels can be filled by electrodeposition in which a mesoporous material is contained in a plating accelerator-containing solution and applied current is periodically reversed during when electroplating is performed, which is a periodic pulse reverse (PPR) method.

Alternatively, channels can be filled by reduction in which a reduction reaction of a mesoporous material is induced in, for example, an AgNO$_3$ solution.

Nanowire Grid Polarizer

A nanowire grid polarizer obtained using the method as described above will now be described in detail with reference FIGS. 10 and 11.

Figure 10:
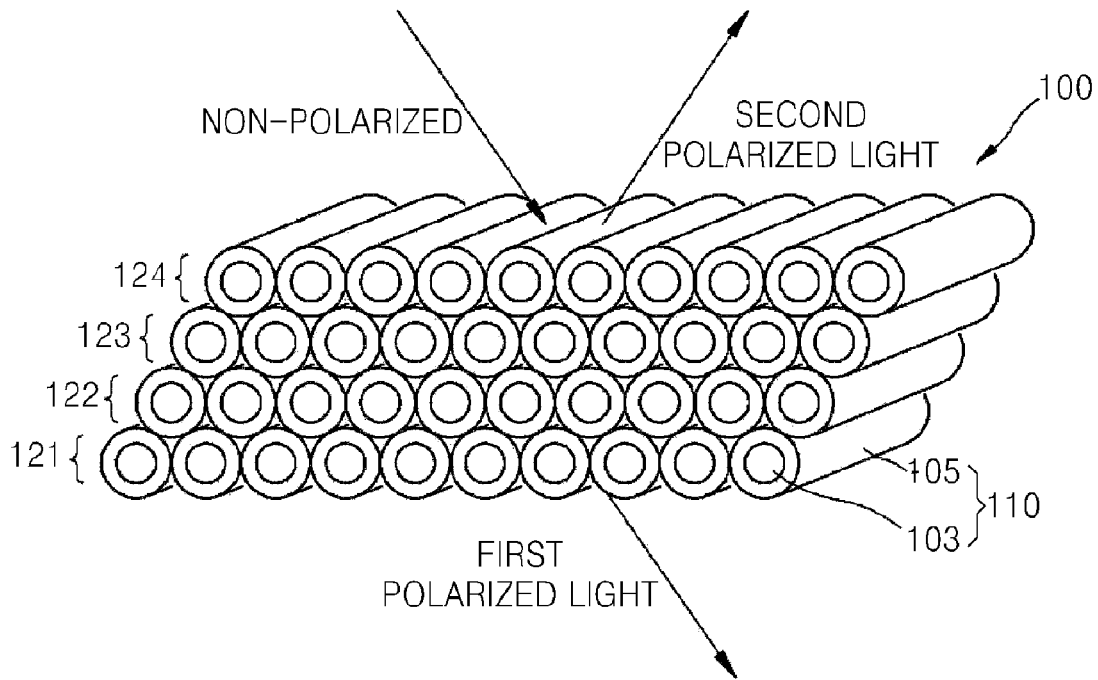
FIG. 10 is a perspective view of a nanowire grid polarizer according to an embodiment of the present invention.

Referring to FIG. 10, the nanowire grid polarizer according to an embodiment of the present invention includes a plurality of nanowire array layers. Each of the nanowire array layers includes a regular array of a nanowire-shell structure 110 consisting of a nanowire 103 as a core and a silica shell 105. The nanowire array layers can include, for example, first, second, third, and fourth nanowire array layers 121, 122, 123, and 124. The nanowire 103 can be formed from, for example, one or more metals selected from Al, Ag, Au, Cu, or Ni. The nanowire-shell structure 110 can contact another nanowire-shell structure. Alternatively, the nanowire-shell structure 110 can be separated from another nanowire-shell structure. Due to such nanowire-shell structure, the nanowire 103 can be protected from damage resulting from exposure or from physical impacts, and the silica shell 105 may be induced from a silica precursor. The nanowire 103 is separated from another nanowire with a predetermined distance by the silica shell 105 formed of a dielectric material, and thus can act as a grid polarizer. The nanowire 103 can have various diameters w and various alignment cycles p by changing template composition forming conditions in the method of manufacturing a nanowire grid polarizer. Therefore, when a non-polarized light enters the obtained nanowire grid polarizer, a first polarized light penetrates to the inside of a device, but a second polarized light is reflected and reused. Also, an outer surface of the silica shell 105 can be further coated with a dielectric material such as silica to obtain a grid polarizer including a mesoporous material 205, as illustrated in FIG. 11.

Figure 11:
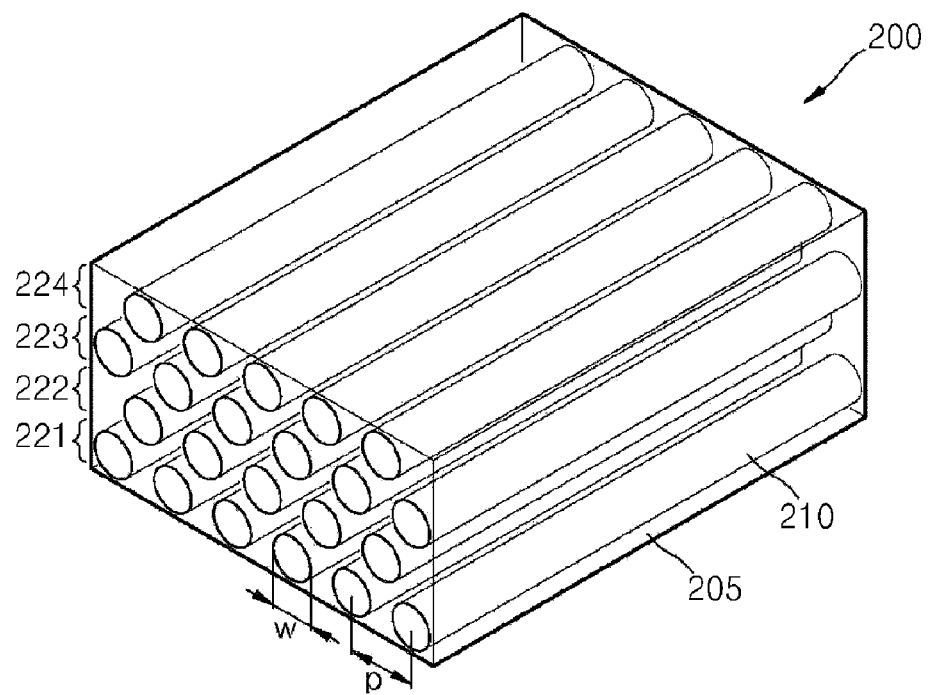
FIG. 11 is a perspective view of a nanowire grid polarizer according to another embodiment of the present invention.

Referring to FIG. 11, a nanowire grid polarizer 200 includes the mesoporous material 205 having a regular array of nanowires 210 filling pores. The mesoporous material 205 is formed of silica induced from a silica precursor. Each of the nanowires 210 are periodically separated in parallel from each other to form nanoarray layers 221, 222, 223, and 224. Also, each of the nanoarray layers 221, 222, 223, and 224 are deposited and separated from each other. Likewise, the diameter (w) and alignment cycle (p) of the nanowires 210 can be controlled by changing template composite forming conditions in the method of preparing a nanowire grid polarizer The present invention will be described in further detail with reference to the following examples. These examples are for illustrative purposes only and are not intended to limit the scope of the present invention.

EXAMPLES

Example 1

Preparation of Mesoporous Material

A polyimide precursor was coated on a glass substrate and then imidified using a heat-treatment process at about 200° C. for 1 hour. The obtained polyimide film was rubbed using a rubbing machine to obtain a one-dimensional fine pattern.

0.7 g of P123 that acts as a surfactant was added to 2 g of ethanol solution and stirred at room temperature for three hours to prepare an organic polymer solution A. 2.6 g of TEOS that acts as a silica precursor and HCl solution (pH=2) were added to 3 g of ethanol solution and the obtained mixture was stirred at room temperature for 15 minutes to prepare a silica precursor solution B. The organic polymer solution A and the silica precursor solution B were mixed and stirred at room temperature for three hours to prepare a mesoporous film composition solution.

The mesoporous film composition solution was spread on the prepared glass substrate, and then, a spin coating process was performed at 4000 rpm for 5 seconds and at 3000 rpm for 30 seconds. The coated mesoporous film composition was aged at a humidity of 56% and at 23° C. for 24 hours to prepare a silica template composite. Then, the obtained silica template composite was heated while the temperature was increased by 1° C. per minute and then, calcined at 400° C. for 4 hours. As a result, the surfactant inside the silica template composite was removed and a mesoporous material having a regular array of channels was completely prepared.

Figure 4:
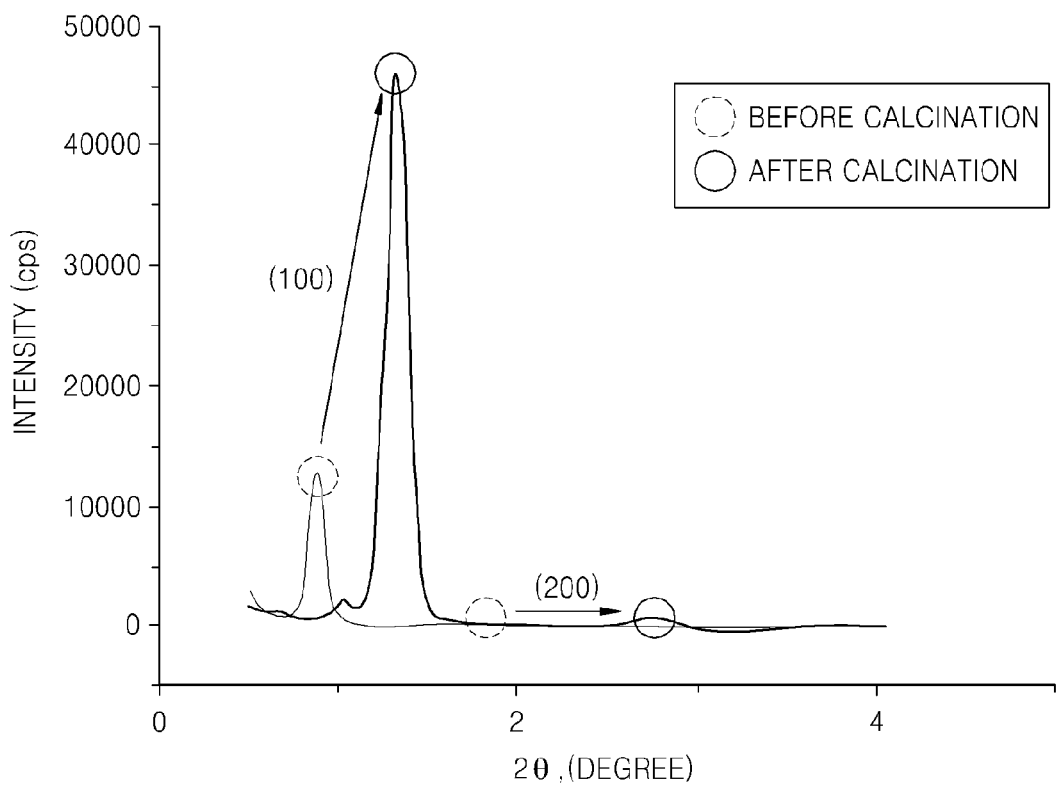
FIG. 4 is an X-ray diffraction (XRD) spectrum of a mesoporous material prepared according to Example 1 before and after a calcination process.

FIG. 4 is an X-ray diffraction (XRD) spectrum of a mesoporous material prepared according to Example 1 before and after a calcination process. Referring to FIG. 4, there is only a small structural contraction before and after a calcination process and the X-ray diffraction spectrum has peaks 100 and 200 in a low angle region, which indicate presence of a second-dimensional hexagonal structure independently from the calcination process. As described above, it can be seen that a nanoporous material prepared using a method according to the present invention has excellent structural uniformity.

Figure 5:
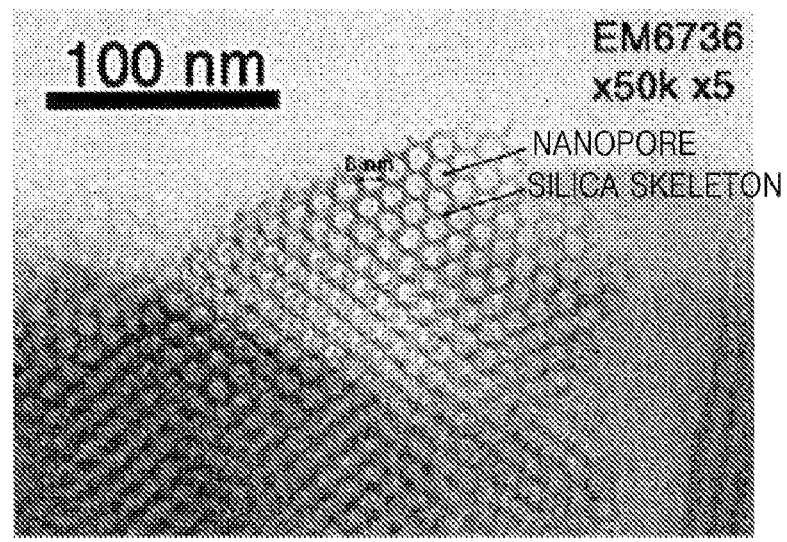
FIG. 5 is a transmission electron microscopic (TEM) image of a cross-section of a mesoporous material prepared according to Example 1 obtained by cutting the mesoporous material in a direction perpendicular to a length-wise direction of a channel.
Figure 6:
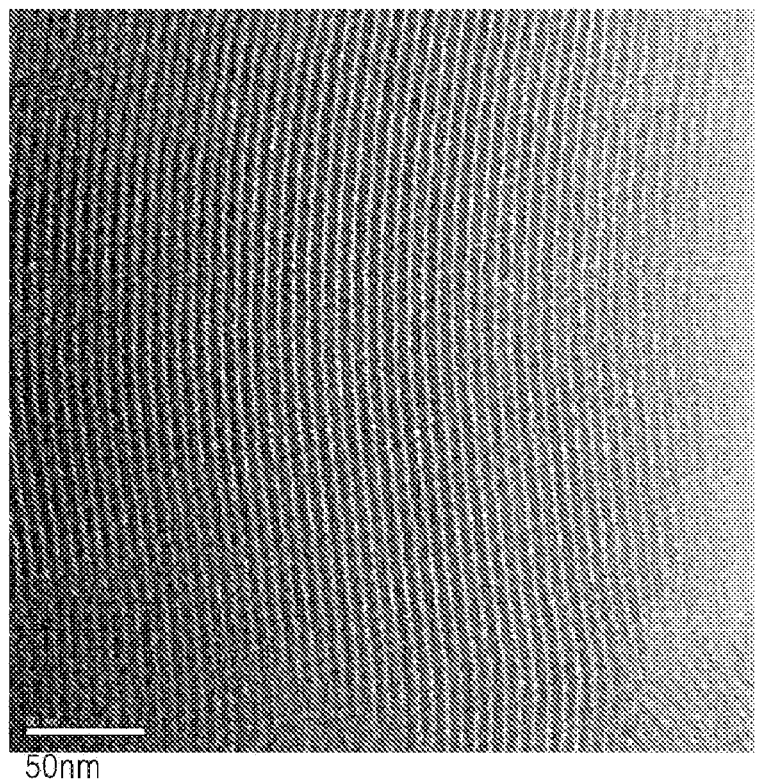
FIG. 6 is a TEM image of a top view of the mesoporous material prepared according to Example 1.

FIG. 5 is a transmission electron microscopic (TEM) image of a cross-section of a mesoporous material prepared according to Example 1 obtained by cutting the mesoporous material in a direction perpendicular to a length-wise direction of a channel. Referring to FIG. 5, it can be seen that about 8 nm of a nano pore is formed in a silica skeleton. FIG. 6 is a TEM image of a top view of the mesoporous material. Referring to FIG. 6, channels defined by the silica skeleton are laterally aligned.

Example 2

Preparation of Mesoporous Material

A mesoporous material was prepared in the same manner as in Example 1, except that the stirring time period of the organic polymer solution A and the silica precursor solution B was in the range of 1 hour to 5 hours. The obtained mesoporous material had a regular channel structure in which neighboring channels are separated at a distance of about 4 nm to 5 nm.

Example 3

Preparation of Mesoporous Material

A mesoporous material was prepared in the same manner as in Example 1, except that the organic polymer solution A and the silica precursor solution B were stirred at a temperature of 30° C. to 80° C. As a result, it can be seen that channels of the mesoporous material have a regular structure at a temperature of 30° C. to 75° C. and a distance between neighboring channels was increased from about 3.5 nm to 6.0 nm as the temperature was increased in such temperature range.

Example 4

Preparation of Mesoporous Material

A mesoporous material was prepared in the same manner as in Example 1, except that the surfactant and silica precursor were used in a different mixture ratio. It can be seen that when the mixture ratio of surfactant/silicaprecursor was reduced from 0.018 to 0.009, the distance between neighboring channels of the obtained mesoporous material was increased from about 3.0 nm to about 6.2 nm. Also, it was identified through, for example, a XRD spectrum that channels have a regular structure in such mixture ratio.

Example 5

Formation of Nickel Nanowire using Paladium Catalyst a. Loading of Palladium

The mesoporous material prepared according to Example 1 was added to 50 ml of 0.01M [Pd(NH3)4]2+-containing ethanol solution and the resultant solution was stirred for 4 hours and dried for one hour at 60° C. The obtained product was washed using ethanol to remove the residual [Pd(NH3)4]2+ ion and dried at 60° C. for 1 hour. The obtained mesoporous material was refluxed in ethanol for 15 minutes and the refluxed mesoporous material was washed using water and dried.

Such palladium ion-loaded mesoporous material was stirred in 50 ml of 0.3M $NaBH_4$ solution so as to reduce the palladium ion, and then the obtained mesoporous material was washed and dried.

b. Filling with Nickel

The palladium-loaded mesoporous material was added to a nickel bath in which 0.1 g of $Ni(SO_4)_2$, 0.075 g of EDTA, 0.2 g of $(NH_4)_2SO_4$, 0.08 g of $NaH_2PO_2$ and 0.08 g of NaOH were dissolved in a mixture solution of 5 g of distilled water and 5 g of ethanol, and then the pH of the resultant solution was adjusted from 6 to 7 using HCl. In this state, a plating process was performed for 30 minutes. Then, a washing process was performed with water and a drying process was performed.

Figure 8:
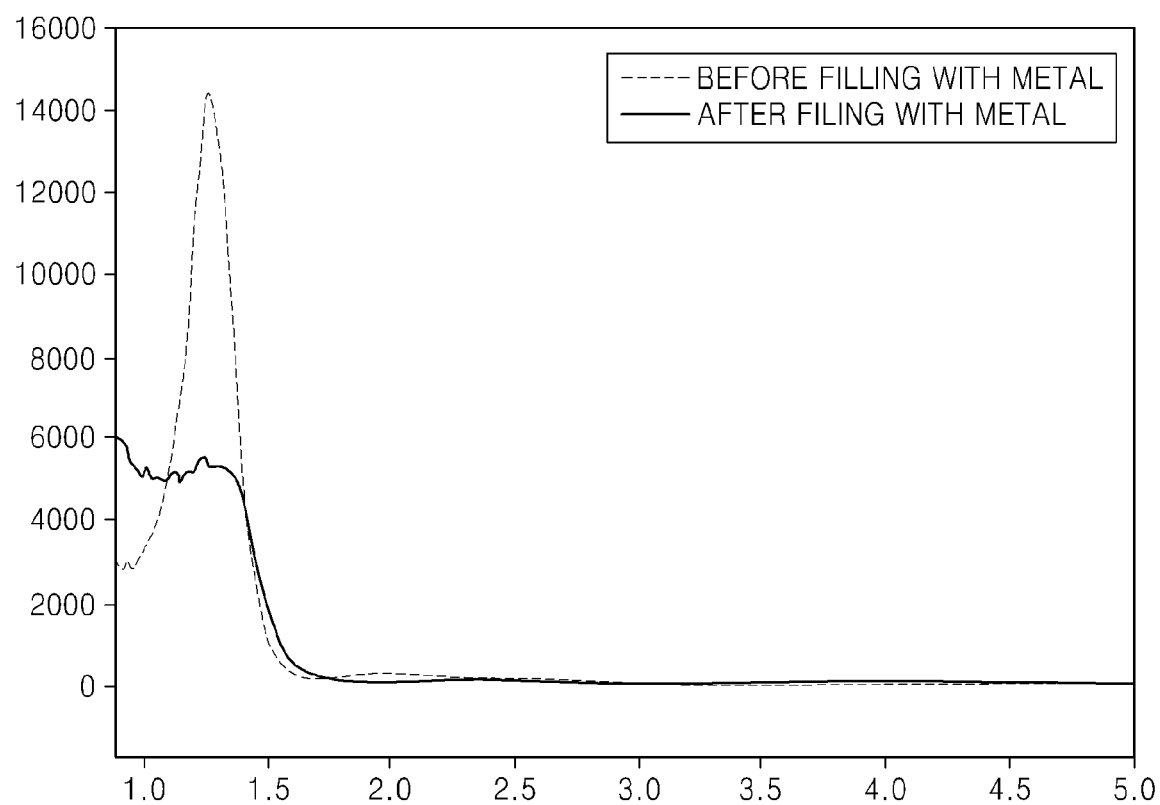
FIG. 8 is an XRD graph of a mesoporous material prepared according to Example 5 before and after filling with metal.

FIG. 8 is an XRD graph of the mesoporous material before and after filling with nickel. Referring to FIG. 8, after the filling with nickel, the peak in the vicinity of 2θ=1.3 disappeared, which shows that channels of the mesoporous material were filled with metal.

Example 6

Formation of Ag Nanowire through Reduction

Figure 9:
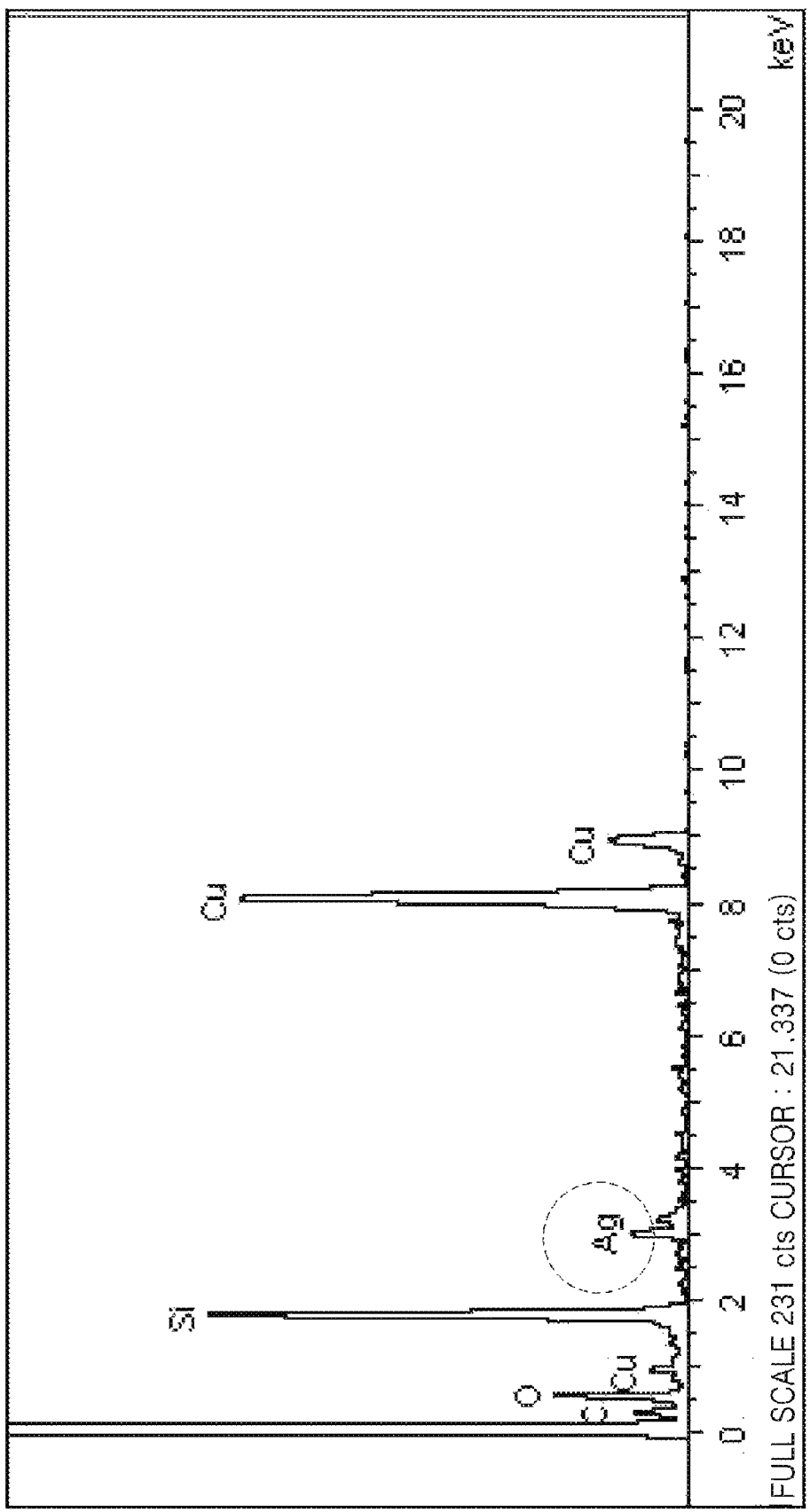
FIG. 9 is a FT-IR spectrum of a mesoporous material filled with silver nanowire prepared according to Example 6.

The mesoporous material prepared according to Example 1 was added to a 0.2M AgNO3-containing ethanol:distilled water solution in which a mixture ratio of ethanol:distilled water is 1:1, and then left sit overnight to induce a reducing reaction. Then, the mesoporous material was taken from the obtained solution and washed using water and dried. Then, the dried mesoporous material was heat treated in air at 300° C. Elements of the obtained nanowire were analyzed using FT-IR, and the results are shown in FIG. 9.

Example 7

Formation of Ag Nanowire through Electroless Plating 0.6749 g of $AgNO_3$, 1.55 g of cobalt sulfate, 9.91 g of ammonium sulfate, and 16.33 ml of an aqueous ammonia ($NH_4OH$) were added to 50 ml of distilled water and then all solids in the resultant solution were dissolved using supersonic waves to prepare an Ag plating solution.

1 g of $SnCl_2$ and 1 ml of trifluoroacetic acid were added to a mixture solvent of 100 ml of distilled water and 100 ml of methanol to prepare an initiation solution. The mesoporous material prepared according to Example 1 was immersed in the initiation solution for 5 minutes and then the mesoporous material was washed with 100% anhydrous ethanol three times.

The obtained mesoporous material was added to the Ag plating solution and shaken using a wrist action shaker for about 2 hours to form a silver nanowire.

Example 8

Formation of Ag Nanowire through APTES

Figure 12:
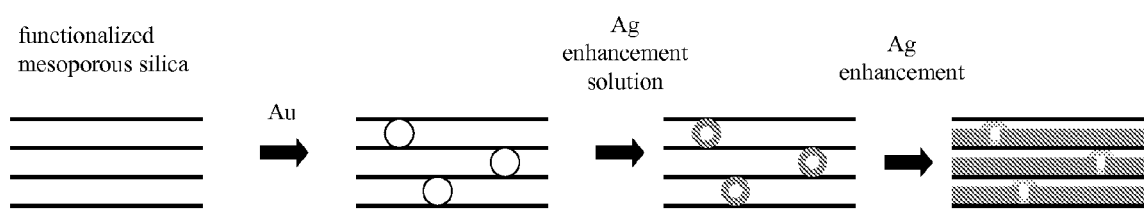
FIG. 12 is a schematic representation of the formation of silver nanowires according to an exemplary embodiment.

Referring to FIG. 12, 80 mg of silver acetate was added to 40 ml of distilled water and stirred for 15 minutes to prepare Solution A. 23.5 g of trisodium citrate dehydrate and 25.5 g of monohydrate citrate were dissolved in 850 ml of distilled water to prepare a citrate buffer. 200 mg of hydroquinone was dissolved in 40 ml of the citrate buffer to prepare Solution B. Solution A and Solution B were mixed to prepare a silver enhancement solution.

1 g of the mesoporous material prepared according to Example 1 and 3-minopropyltriethoxysilane (APTES) were added to 30 ml of dried toluene and refluxed for 24 hours so as to functionalize silica.

Particles of Au were provided to inside channels of the functionalized mesoporous material. Then, Ag was grown using the prepared silver enhancement solution to completely form a silver nanowire.

According to a method according to embodiment of the present invention, a nanowire grid polarizer having a stable structure can be obtained using a mesoporous material. The method of the present invention does not use a vacuum process and is suitable for mass production and large-area production.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of preparing a nanowire grid polarizer, the method comprising:

mixing a poly(alkylene oxide) triblock copolymer surfactant with a hydrophilic head region and a hydrophobic tail region and a silica precursor to prepare a mesoporous film composition;

coating the mesoporous film composition on a substrate;

aging the coated film to form a silica template composite;

removing the surfactant inside the silica template composite to prepare a mesoporous material having channels, the channels being laterally aligned to have a hexagonal array; and filling the channels of the mesoporous material with metal, thereby producing the nanowire grid polarizer including a plurality of nanowire array layers, wherein each of the nanowire array layers includes a regular array of a nanowire-shell structure consisting of a nanowire of the metal as a core and a silica shell in which the nanowire is separated from another nanowire by the silica shell, thereby when an incident light including a first polarized light and a second polarized light is irradiated onto the nanowire grid polarizer, the nanowire grid polarizer transmits the first polarized light but reflects the second polarized light using the metallic nanowire as a lattice.

2. The method of claim 1, before the coating with the mesoporous film composition, further comprising performing an orientation treatment process on the substrate by rubbing the substrate so that the substrate has an orientation.

3. The method of claim 2, wherein the orientation treatment process comprises forming a polyimide film on the substrate; and rubbing a surface of the polyimide film in a direction.

4. The method of claim 3, wherein the forming of the polyimide film comprises coating a polyimide precursor on a substrate; and imidizing the coated polyimide precursor by heat treating.

5. The method of claim 3, wherein the silica template composite is aligned in a direction perpendicular to the direction in which the rubbing is performed.

6. The method of claim 1, further comprising applying a shearing strain to the coated film on the substrate before the coated film is solidified.

7. The method of claim 1, wherein the mesoporous film composition is coated by spin coating, dip coating, or bar coating.

8. The method of claim 1, wherein the silica precursor comprises one or more compound selected from the group consisting of tetraethylorthosilicate (TEOS), tetramethylorthosilicate (TMOS), tetrabutyl orthosilicate (TBOS) and SiCl4.

9. The method of claim 1, wherein the surfactant is removed by calcination or treating with an acid.

10. The method of claim 9, wherein the calcination is performed at a temperature of 350° C. to 500° C. for 30 minutes to 10 hours.

11. The method of claim 1, wherein the metal comprises one or more metals selected from the group consisting of Al, Ag, Au, Cu, and Ni.

12. The method of claim 1, wherein the metal is added to inside of the channels of the mesoporous material using an electroless plating method, a chemical reduction method, a metal amplification method, or an electrodeposition method.

* * * * *